United States Patent
Zolich et al.

(10) Patent No.: US 9,422,064 B2
(45) Date of Patent: Aug. 23, 2016

(54) ROTORCRAFT TIE-DOWN DETECTOR SYSTEM

(71) Applicant: HONEYWELL INTERNATIONAL INC., Morristown, NJ (US)

(72) Inventors: Artur Zolich, Zabrzeg (PL); Vaclav Mares, Prague (CZ); Miroslav Smid, Prague (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 355 days.

(21) Appl. No.: 14/150,427

(22) Filed: Jan. 8, 2014

(65) Prior Publication Data

US 2015/0191255 A1    Jul. 9, 2015

(51) Int. Cl.
*B64F 1/12*      (2006.01)
*B64D 45/00*   (2006.01)
*B64F 1/16*      (2006.01)
*B63B 25/24*    (2006.01)

(52) U.S. Cl.
CPC ............... *B64D 45/00* (2013.01); *B64F 1/125* (2013.01); *B64F 1/16* (2013.01); *B63B 25/24* (2013.01); *B63B 2025/245* (2013.01); *B64F 1/12* (2013.01)

(58) Field of Classification Search
CPC .... B63B 2025/245; B63B 25/24; B64F 1/125
USPC ........................................................ 224/324
See application file for complete search history.

(56) References Cited

U.S. PATENT DOCUMENTS

| | | | |
|---|---|---|---|
| 4,834,321 A | 5/1989 | Granger | |
| 4,981,456 A | 1/1991 | Sato et al. | |
| 5,574,430 A * | 11/1996 | Ott | G08B 13/1463 340/566 |
| 6,708,926 B2 | 3/2004 | Bonisch | |
| 6,874,729 B1 | 4/2005 | McDonnell | |
| 7,131,610 B2 | 11/2006 | Swadling | |
| 7,513,478 B1 | 4/2009 | Diaz | |
| 7,866,601 B2 | 1/2011 | Balaskovic | |
| 8,175,758 B2 | 5/2012 | Mouton | |
| 8,506,220 B2 * | 8/2013 | Morland | B60P 7/0861 340/440 |
| 2002/0109045 A1 | 8/2002 | Beach et al. | |

FOREIGN PATENT DOCUMENTS

| | | | |
|---|---|---|---|
| AU | 2010202467 A1 | 1/2012 | |
| FR | 2667570 B1 | 10/1994 | |
| FR | KR20150031025 | * 9/2013 | .............. B63B 35/50 |
| JP | H05338596 A | 12/1993 | |
| KR | 20130136945 A | 12/2013 | |
| KR | 20150031025 A | 3/2015 | |
| WO | 9509103 A1 | 4/1995 | |

OTHER PUBLICATIONS

Extended EP search report for EP 14188917.0-1757 dated Jun. 19, 2015.

* cited by examiner

*Primary Examiner* — Steven Lim
*Assistant Examiner* — Benyam Haile
(74) *Attorney, Agent, or Firm* — Ingrassia, Fisher & Lorenz, P.C.

(57) ABSTRACT

A system and method is provided for alerting a crew member of a rotorcraft that at least one tie-down device is still attached to the rotorcraft is provided. The system includes or cooperates with at least one source of tie-down sensor data. A processor is operationally coupled to the source of tie-down sensor data and to a source of rotorcraft data and causes a warning to be generated if at least one attached tie-down device is sensed.

17 Claims, 5 Drawing Sheets

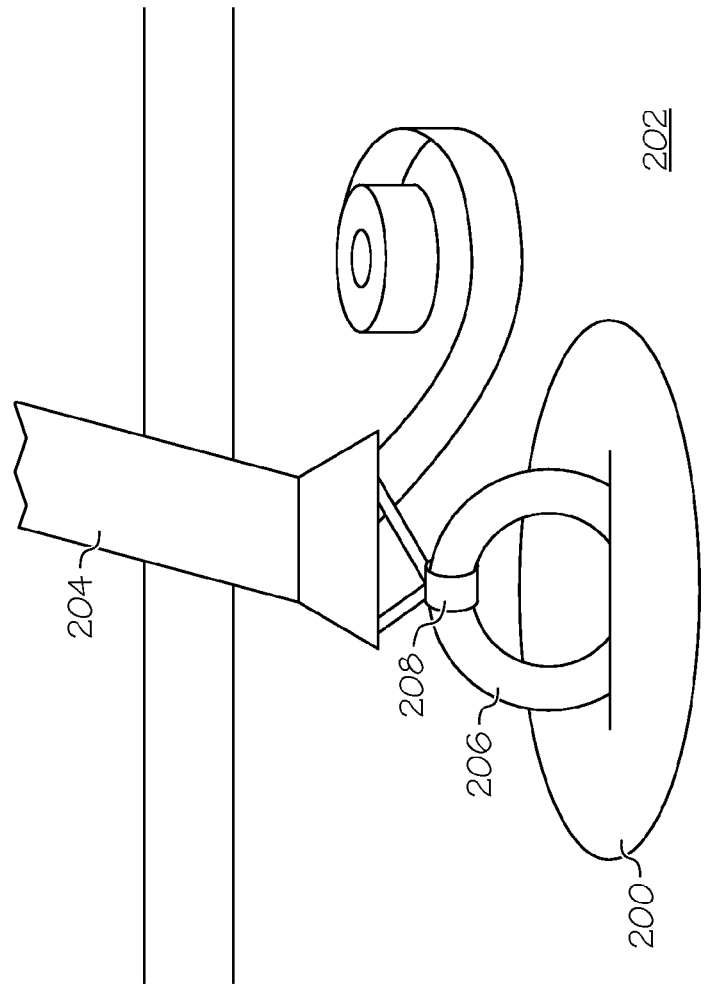

ROTORCRAFT TIE-DOWN DETECTOR SYSTEM

TECHNICAL FIELD

Embodiments of the subject matter described herein relate generally to rotorcraft safety systems. More specifically, embodiments of the subject matter relate to a system and method that detects attached tie-down devices and generates warnings before and during an attempted take-off if at least one attached tie-down device is present.

BACKGROUND

Tie-down devices are used to secure rotorcraft, such as helicopters, to a surface suitable for supporting the rotorcraft (hereinafter "support surface"). Support surfaces include, for example, landing surfaces such as a landing pad or the deck of a ship. Tie-down devices may be placed at locations on the rotorcraft referred to as tie-down points. Tie-down devices may also be found on the support surface. Fasteners, such as ropes, straps, chains, and the like may be used to couple a rotorcraft tie-down device to a support surface tie-down device by means of hooks or clips on each end. Hereinafter, "tie-down assembly" refers to the combination of components such as tie-down devices, fasteners, and hooks or clips suitably configured to couple a rotorcraft tie-down point to a support surface. As such, when a rotorcraft tie-down device has a fastener coupled to it, the rotorcraft tie-down device is referred to as "attached". Likewise, when a given tie-down assembly is coupled on one end to a rotorcraft and on another end to a support surface, the tie-down assembly is referred to as "attached."

Attached tie-down assemblies protect the rotorcraft from possible damage during, for example, rough seas and/or windy conditions. Before taking off, all tie-down assemblies and tie-down devices must be detached; however, sometimes, during exigent circumstances or emergency situations, one or more rotorcraft tie-down devices may be inadvertently left attached, limiting rotorcraft mobility and perhaps causing the rotorcraft to flip over. An attempted take-off occurs when the rotorcraft begins to lift off of the support surface. A noticeable amount of helicopter accidents are related to attempted take-offs while rotorcraft tie-down devices are attached, and the reported number of accidents does not reflect attempted take-off events with attached rotorcraft tie-down devices that did not result in reportable accidents.

Accordingly, it is desirable to provide a rotorcraft tie-down detector system that detects attached tie-down devices and generates a warning before and during an attempted take-off if at least one rotorcraft tie-down device remains attached. Such a tie-down device detector system would increase situational awareness and safety.

Other desirable features will become apparent from the following detailed description and the appended claims, taken in conjunction with the accompanying drawings and this background.

BRIEF SUMMARY

A method for detecting the attachment of at least one rotorcraft tie-down device is provided. A sensor detects if at least one tie-down device is attached and generates a warning in response thereto.

Also provided is a method for enhancing rotorcraft safety. At least one sensor device is monitored. If it is determined that at least one rotorcraft tie-down device is attached, a warning associated with the attached tie-down device is generated.

A system for detecting the attachment of at least one rotorcraft tie-down device is also provided. The system includes a first sensor coupled to at least one tie-down device. The first sensor detects if the tie-down device is coupled to a fastener. A processor generates an alert if the tie-down device is coupled to a fastener.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures and wherein:

FIG. 2 is a diagram illustrating a tie-down device on a support surface, with a fastener attached;

DETAILED DESCRIPTION

Figure 1:
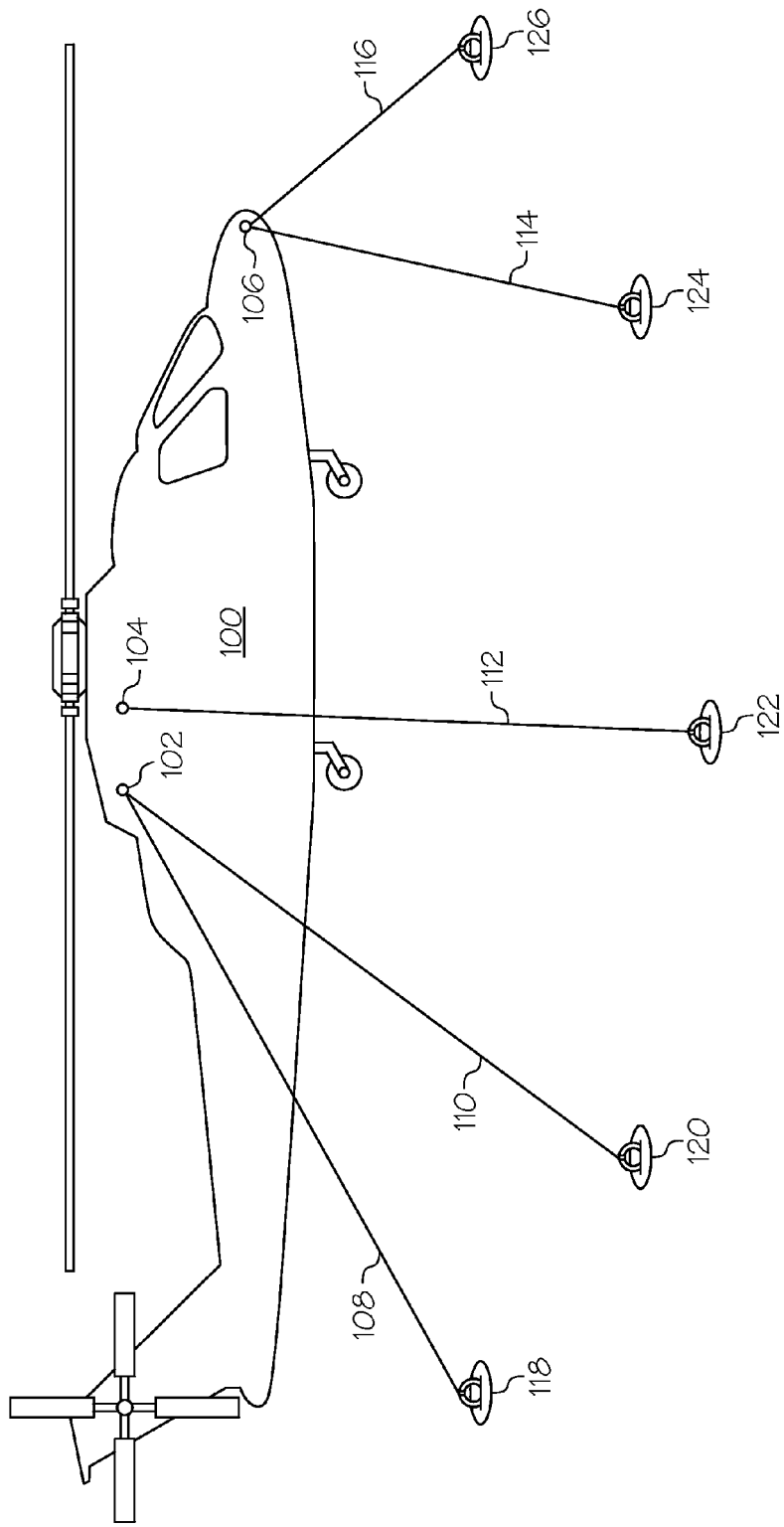
FIG. 1 is a diagram of a helicopter having fastenings coupling tie-down devices on the helicopter to tie-down devices on a support surface.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or components may employ various integrated circuit components (e.g. memory elements, digital signal processing elements, logic elements, look-up tables, or the like) that may carry out a variety of functions under the control of one or more microprocessors or other control devices.

The system and methods described herein can be deployed with any vehicle that may be subjected to fasteners at tie-down devices, such as rotorcraft. The exemplary embodiment described herein assumes that the rotorcraft engine is off prior to starting the rotorcraft tie-down detector system; however, a tie-down device sensors may detect the attachment of tie-down assemblies when the rotorcraft engine is running.

Furthermore, the system and methods presented herein generate a warning in response to at least one tie-down assembly being attached. The warning can take the form of symbology displayed on the existing rotorcraft display. Alternatively, the warning can be an audible alert, and can be symbology displayed on a separate display unit. The detector system may prevent the pilot from starting the engine of the rotorcraft. In certain embodiments, the warning is rendered on a graphical display of the rotorcraft that includes a visual indication of the specific tie-down assembly or assembly components that remain attached.

Tie-down assemblies include tie-down devices that are installed at tie-down points on the rotorcraft and on the support surface. Multiple types of tie-down devices are available, and may be chosen to meet the needs of a specific application. Factors taken into account in the selection of a tie-down device may include: mean take-off weight (MTOW) of the rotorcraft, the number of desired tie-down points on the rotorcraft, the type of fastener to be utilized, weather and/or climate considerations, and the like.

Within a tie-down assembly, fasteners secure the stationary rotorcraft to a support surface. That is, a first end of a fastener is coupled to a tie-down device on the rotorcraft and a second end of the fastener is coupled to a tie-down device on the support surface. Fasteners may be chains, cables, straps, etc., and may include hooks, clips, or the like at each end. The fastener may have a conductive quality, and may interact electrically with one or more sensor devices. For example, the fastener may be conductive between tie-down devices on the support surface and the rotorcraft when attached and cease conduction when detached. In another exemplary embodiment, induction sensors may be used at any tie-down device, to detect the presence of metal fastenings.

Sensor devices may be employed at various locations within the tie-down assembly. In one embodiment, tie-down devices are located at tie-down devices on the rotorcraft. In some embodiments, sensor devices may be employed at tie-down devices on the support surface. In other embodiments, sensor devices are employed in the fastener, the hooks or clips. In still other embodiments, sensors may be employed at both the rotorcraft tie-down devices and the support surface tie-down devices. The sensor devices are used to detect attachment of a tie-down assembly. Various types of sensor devices may be used; e.g., pressure sensors, conductivity sensors, electrical signal sensors, induction sensors, radio frequency signal sensors, etc.

FIG. 1 is a diagram of a rotorcraft 100, having fasteners coupling tie-down devices on the helicopter to tie-down devices on the support surface. FIG. 1 illustrates rotorcraft 100 with multiple tie-down assemblies. The tie-down assemblies shown are comprised of: rotorcraft tie-down devices 102, 104 and 106; fasteners 108, 110, 112, 114, and 116; and support surface tie-down devices 118, 120, 122, 124 and 126.

For simplicity, FIG. 1 shows fasteners and tie-down devices on only one side of the rotorcraft 100; however, it can be readily appreciated that rotorcraft 100 is secured on all sides with fasteners to tie-down devices. The number and placement of tie-down devices on a rotorcraft varies by rotorcraft; in fact, the rotor of the rotorcraft may even have suitable tie-down devices. Likewise, the number and placement of tie-down devices on the support surface may vary. Ultimately, when the rotorcraft is being secured to the support surface, the pilot or crew will utilize the number of fasteners and tie-down devices that are appropriate for the situation.

FIG. 2 illustrates a tie-down device 200, fastener 204 and a support surface 202. As can be seen, the fastener 204 is attached to tie-down device 200. The support surface 202 may be concrete, asphalt or any other suitable surface, such as the deck of a ship.

Exemplary tie-down device 200 has a ring-shaped loop 206 to which the fastener 204 is attached by means of a hook or clip, as shown at 208. An exemplary fastener 204 is a strap; however, as described herein, the fastener may alternatively be a rope, strap, chain, or the like.

Figure 4:
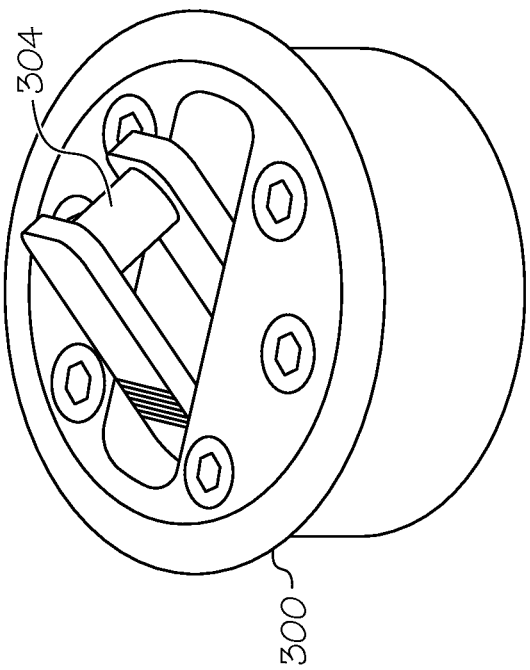
FIG. 4 is a diagram illustrating a tie-down device for a support surface in greater detail.
Figure 3:
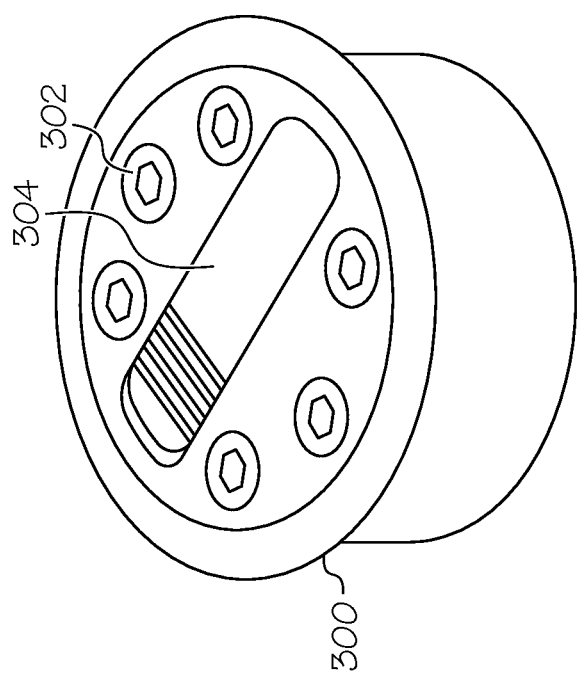
FIG. 3 is a diagram illustrating a tie-down device for a support surface.

FIGS. 3 and 4 are isometric views of a tie-down device 300 that may be deployed on a support surface. The tie-down device 300 may be secured to the support surface with fasteners 302 such as screws, bolts, adhesives, or the like. Alternatively, the tie-down device 300 may be welded into, or implanted into the support surface, e.g., for support surfaces made of concrete, asphalt, or the like. The exemplary tie-down device 300 has a revolving "eye" 304 (shown closed) that facilitates alignment with the rotorcraft. FIG. 4 shows the revolving eye 304 open for attachment to a fastener. When the tie-down device 300 is not in use, the revolving eye 304 can be closed, as shown in FIG. 3, rendering the tie-down device flush with the support surface.

Figure 5:
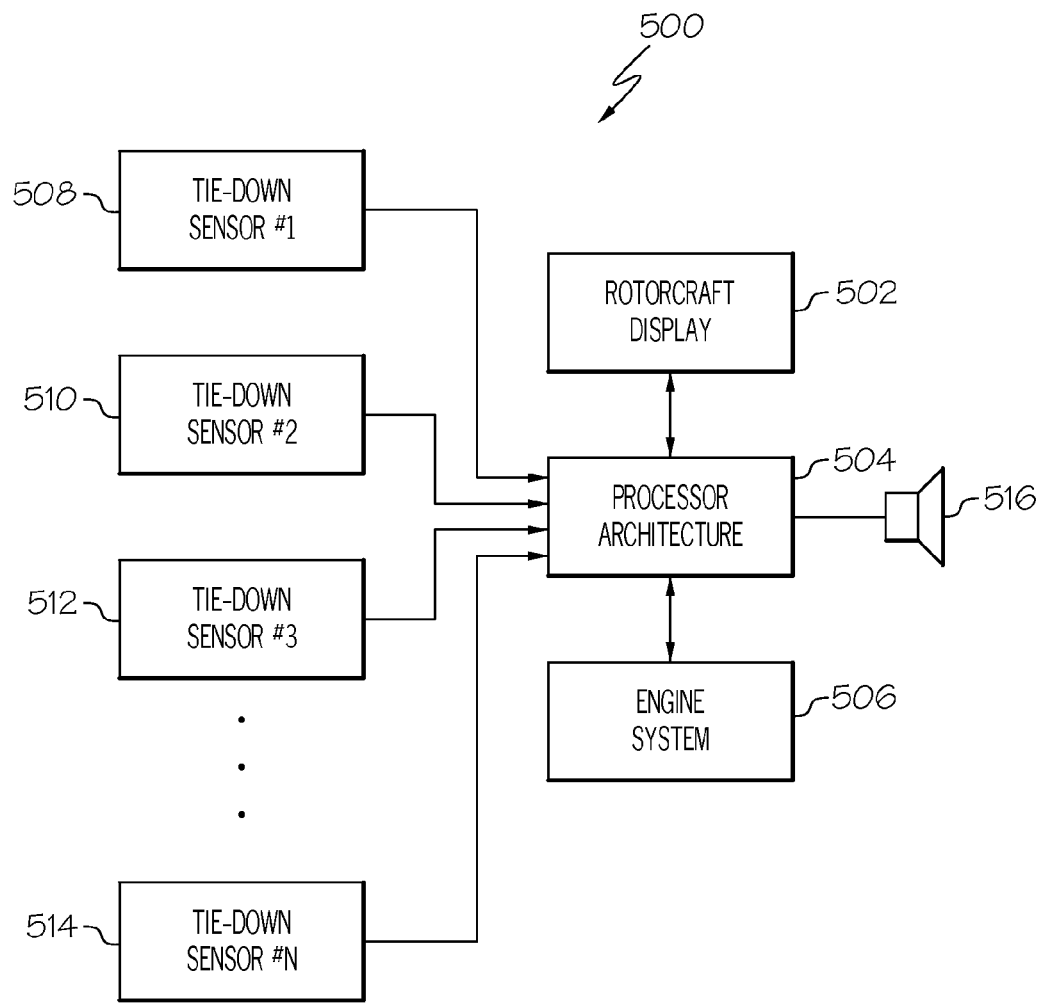
FIG. 5 is a block diagram of a rotorcraft tie-down detector system in accordance with an exemplary embodiment.

FIG. 5 is a block diagram 500 of a rotorcraft tie-down detector system in accordance with an exemplary embodiment. FIG. 5 does not depict the vast number of systems and subsystems that would be employed in a practical implementation of the rotorcraft 100. Instead, FIG. 5 depicts the notable functional elements and components of the rotorcraft 100 that support the various features, functions, and operations described in more detail below. In this regard, the rotorcraft 100 may include, without limitation: a rotorcraft display 502, processor architecture 504; a device 516 for generation of an audible alert, and an engine system 506. Multiple tie-down sensors 508, 510, 512, and 514 from the tie-down assemblies are coupled to processor architecture 504 as needed to support their cooperative functionality.

The processor architecture 504 may be implemented or realized with at least one general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. As described in more detail below, the processor architecture 504 is configured to support various operations and display functions.

In practice, the processor architecture 504 may be realized as an onboard component of the rotorcraft 100 (e.g., a flight deck control system, a flight management system, or the like), or in a portable computing device that is carried onboard the rotorcraft 100. For example, the processor architecture 504 could be realized as the central processing unit (CPU) of a laptop computer, a tablet computer, or a handheld device. As another example, the processor architecture 504 could be implemented as the CPU of an electronic flight bag carried by a member of the flight crew or mounted permanently in the rotorcraft. Electronic flight bags and their operation are explained in documentation available from the United States Federal Aviation Administration (FAA), such as FAA document AC 120-76A.

The processor architecture 504 may include or cooperate with an appropriate amount of memory (not shown), which can be realized as RAM memory, flash memory, EPROM memory, EEPROM memory, registers, a hard disk, a removable disk, a CD-ROM, or any other form of storage medium known in the art. In this regard, the memory can be coupled to the processor architecture 504 such that the processor architecture 504 can read information from, and write information to, the memory. In the alternative, the memory may be integral to the processor architecture 504. In practice, a functional or logical module/component of the system described here might be realized using program code that is maintained in the memory. Moreover, the memory can be used to store data utilized to support the operation of the system, as will become apparent from the following description.

The outputs from the tie-down sensors 508, 510, 512, and 514 are provided to the processor architecture 504. The processor architecture also obtains engine status data from engine system 506. Based on at least the engine status and the input from tie-down sensors 508, 510, 512, and 514, the processor architecture 504 determines if a warning should be generated. In one embodiment, the processor architecture 504 generates a warning if at least one tie-down assembly is attached when a take-off operation is initiated. The rotorcraft display 502 receives warning information from the processor architecture 504, and displays lights, symbols or other visually distinguishable warnings for the user. The warnings alert the pilot that it would be unsafe to continue. Device 516 may generate an audible alert.

The tie-down sensors 508, 510, 512, and 514 represent various sensor devices, detectors, diagnostic components, and their associated subsystems within the tie-down assemblies. In this regard, the tie-down sensors 508, 510, 512, and 514 function as sources of tie-down assembly status data for the host rotorcraft and support surface. As described herein, tie-down sensors 508, 510, 512, and 514 may be pressure sensors, conductivity sensors, electrical signal sensors, induction sensors, radio frequency signal sensors, etc. In some embodiments, the sensor device may interact with the attached fastener; e.g., the fastener may itself be conductive, thus capable of conveying a signal that is obtained by processor architecture 504.

Tie-down sensors 508, 510, 512, and 514, the processor architecture 504, and the engine system 506, are each suitably configured to respond in a dynamic manner to provide real-time warnings during operation of the rotorcraft. The processor architecture 504 receives information from the engine system 506 and tie-down sensors 508, 510, 512, and 514, and manages the incorporation, blending, and integration of this information with information from other sources, the result of which is ultimately displayed on the rotorcraft display 502. The rotorcraft display 502 can be suitably configured to receive an output from processor architecture 504, and display the received warning information in an appropriate manner. Alternatively, the warning information can be displayed wirelessly on a display carried by a crew member.

Figure 6:
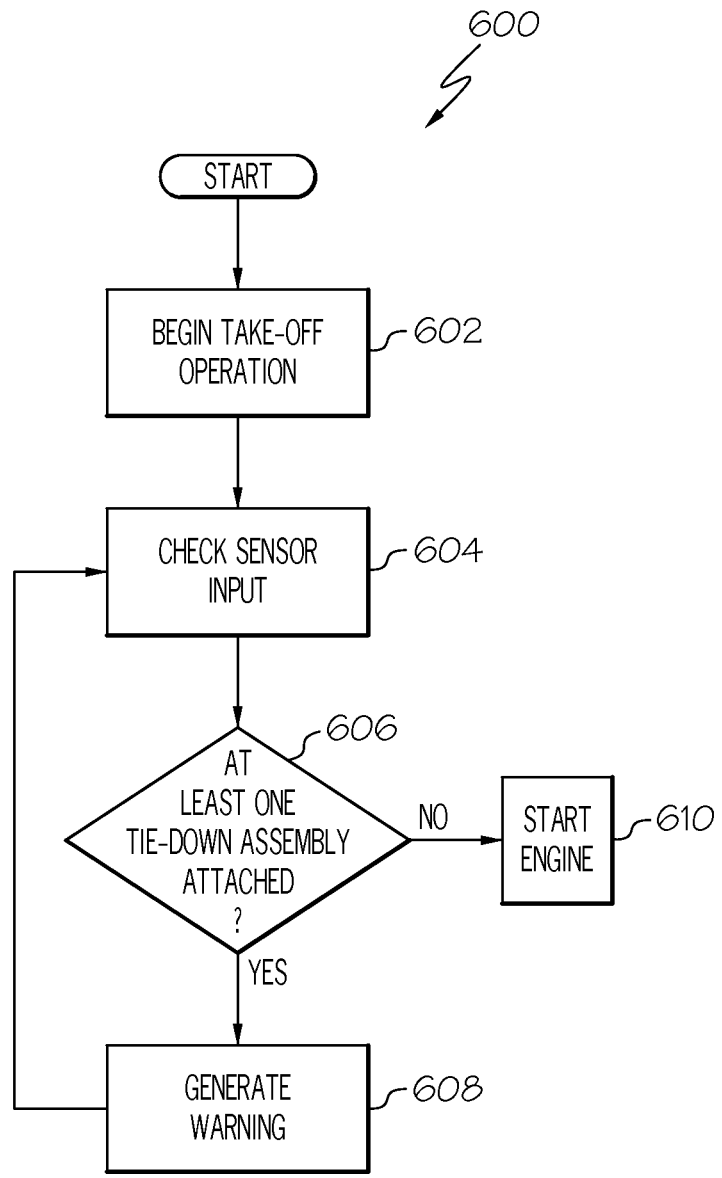
FIG. 6 is a flow chart that illustrates an exemplary embodiment of the rotorcraft tie-down detector system.

FIG. 6 is a flow chart that illustrates an exemplary embodiment of a rotorcraft tie-down detector process 600, carried out by processor architecture 504. The various tasks performed in connection with the process 600 may be performed by software, hardware, firmware, or any combination thereof. It should be appreciated that the process 600 may include any number of additional or alternative steps, the steps shown in FIG. 6 need not be performed in the illustrated order, and process 600 may be incorporated into a more comprehensive procedure or process having additional functionality not described in detail herein. Moreover, one or more of the steps shown in FIG. 6 could be omitted from an embodiment of the process 600 as long as the intended overall functionality remains intact.

In the exemplary embodiment, the rotorcraft tie-down detector process 600 proceeds when a takeoff operation begins. Takeoff operations generally begin when power to the rotorcraft is turned "ON" (STEP 602). Information regarding the status of the engine, e.g., power "ON" or power "OFF" is obtained from the engine system 506. The process 600 then accesses or retrieves input data from the tie-down sensors 508, 510, 512, and 514 (STEP 604). If it is determined that at least one tie-down device is attached (STEP 606), a warning is generated (STEP 608). The process 600 continuously checks sensor input until no attached tie-down devices are sensed, at which time the pilot may start the engine (attempt a take-off) of the rotorcraft (STEP 610).

Based on the rotorcraft tie-down sensor input and the engine status input, the process 600 computes and generates a warning. As described hereinabove, the warning may be an audible alert, a separate and visually distinguishable display item, or additional symbology and/or text integrated into the pre-existing rotorcraft display (STEP 608). In some embodiments, the process 600 will prevent starting of the engine when one or more tie-down assemblies is still attached.

The relatively high refresh rate of the process 600 results in a relatively seamless and immediate updating of the information and of the rotorcraft display. Frequent updating of the rotorcraft display enables the pilot or crew to obtain and respond to the current operating situation in virtually real-time, enhancing situational awareness.

Thus, there has been provided a rotorcraft tie-down detector system that detects attached tie-down devices and generates warnings before and during an attempted take-off if at least one attached tie-down device is present.

While at least one exemplary embodiment has been presented in the foregoing detailed description, it should be appreciated that a vast number of variations exist. For example, the techniques and methodologies presented here could also be deployed as part of a fully automated guidance and display system to allow the flight crew to monitor and visualize the execution of automated maneuvers. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for detecting the attachment of a rotorcraft tie-down device coupled to a rotorcraft, the method comprising:
   detecting, with a sensor, attachment of the rotorcraft tie-down device;
   receiving, by a processor coupled to the sensor, the detected attachment of the rotorcraft tie-down device; and
   in response to the detected attachment of the rotorcraft tie-down device, (1) generating a warning indicative of the attachment of the tie-down device, and (2) preventing an engine system of the rotorcraft from starting.

2. The method of claim 1, wherein the step of generating further comprises displaying, on a display device coupled to the processor, a visually distinguishable warning indicative of the attachment of the tie-down device.

3. The method of claim 1, wherein the step of generating comprises displaying, on a display device, symbology that is graphically representative of the location of the attachment of the tie-down device.

4. The method of claim 1, wherein generating a warning comprises commanding, by the processor, a device for emitting an audible alert to emit an audible alert.

5. The method of claim 1, wherein the sensor is a pressure sensor.

6. The method of claim 1, wherein the sensor is a contactless sensor.

7. The method of claim 1, wherein the sensor is a conductivity sensor.

8. A processor implemented method for enhancing rotorcraft safety, the method comprising:
    monitoring, by the processor, a sensor device associated with a rotorcraft tie down device on the rotorcraft;
    determining, by the processor, based on input from the sensor device, that the rotorcraft tie-down device is attached; and
    in response to determining that the rotorcraft tie-down device is attached, (1) generating a warning that the rotorcraft tie-down device is attached, and (2) preventing an engine system of the rotorcraft from starting.

9. The method of claim 8, wherein the step of generating comprises displaying, on a display device, a visually distinguishable warning indicating that the rotorcraft tie-down device is attached.

10. A system for detecting the attachment of at least one rotorcraft tie-down device coupled to a rotorcraft, comprising:
    a first sensor coupled to the at least one rotorcraft tie-down device for detecting if the tie-down device is coupled to a fastener; and
    a processor coupled to the first sensor and to an engine system of the rotorcraft, the processor configured to determine when the tie-down device is coupled to the fastener, and
    when it is determined that the tie-down device is coupled to the fastener
    (1) initiate an alert that the tie-down device is attached to the fastener, and
    (2) prevent the engine system of the rotorcraft from starting.

11. The system of claim 10, further comprising a display unit coupled to the processor for displaying symbology indicating if the tie-down device is coupled to a fastener.

12. The system of claim 10, further comprising a device for emitting an audible alert coupled to the processor, and wherein the processor is further configured to command the device to emit an audible alert when the tie-down device is coupled to a fastener.

13. The system of claim 10, wherein the sensor is a pressure sensor.

14. The system of claim 10, wherein the sensor is a contactless sensor.

15. The system of claim 10, wherein the sensor is an electrical signal sensor.

16. The system of claim 10, wherein the first sensor is further configured to detect if at least one rotorcraft tie-down assembly is coupled between the rotorcraft and a support surface.

17. The system of claim 16, wherein the tie-down assembly further includes a second sensor coupled to the support surface, wherein the second sensor is further coupled to the processor.

* * * * *